United States Patent
Xin et al.

(10) Patent No.: US 8,281,587 B2
(45) Date of Patent: Oct. 9, 2012

(54) SUPERCHARGED BOOST-ASSIST ENGINE BRAKE

(75) Inventors: Qianfan Xin, Lake Zurich, IL (US); Martin R. Zielke, Lockport, IL (US); Michael D. Bartkowicz, Oswego, IL (US); Luis Carlos Cattani, Aurora, IL (US); Steve Gravante, Westchester, IL (US); Timothy Prochnau, Glendale Heights, IL (US); Antoun Y. Calash, Elk Grove, IL (US); John L. Cagney, Downers Grove, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 602 days.

(21) Appl. No.: 12/540,416

(22) Filed: Aug. 13, 2009

(65) Prior Publication Data

US 2011/0036088 A1 Feb. 17, 2011

(51) Int. Cl.
  *F02B 33/44* (2006.01)
  *F02B 21/00* (2006.01)
  *F02B 37/04* (2006.01)
  *F02G 3/00* (2006.01)
  *F02G 1/00* (2006.01)

(52) U.S. Cl. .......... 60/611; 60/605.1; 60/597; 123/321; 123/322

(58) Field of Classification Search ............ 60/611, 60/597, 605.1; 123/320–323
See application file for complete search history.

(56) References Cited

U.S. PATENT DOCUMENTS

| | | | | |
|---|---|---|---|---|
| 3,234,923 A * | 2/1966 | Fleck et al. | | 123/321 |
| 3,270,730 A * | 9/1966 | Timoney | | 123/561 |
| 3,426,523 A * | 2/1969 | Straub | | 123/321 |
| 4,423,712 A * | 1/1984 | Mayne et al. | | 123/321 |
| 4,485,780 A * | 12/1984 | Price et al. | | 123/321 |
| 4,572,114 A * | 2/1986 | Sickler | | 123/321 |
| 4,706,625 A * | 11/1987 | Meistrick et al. | | 123/321 |
| 4,756,285 A * | 7/1988 | Pischinger | | 60/601 |
| 4,981,119 A * | 1/1991 | Neitz et al. | | 123/321 |
| 5,064,423 A * | 11/1991 | Lorenz et al. | | 60/611 |
| 5,669,365 A * | 9/1997 | Gartner et al. | | 123/568.12 |
| 5,819,538 A * | 10/1998 | Lawson, Jr. | | 60/611 |
| 5,927,075 A * | 7/1999 | Khair | | 60/605.2 |
| 6,209,324 B1 * | 4/2001 | Daudel et al. | | 123/322 |
| 6,216,458 B1 * | 4/2001 | Alger et al. | | 60/605.2 |
| 6,594,996 B2 * | 7/2003 | Yang | | 123/321 |
| 6,829,892 B2 * | 12/2004 | Larson | | 60/597 |
| 6,922,997 B1 * | 8/2005 | Larson et al. | | 60/611 |
| 7,665,302 B2 * | 2/2010 | Nemeth et al. | | 60/605.1 |
| 7,854,118 B2 * | 12/2010 | Vetrovec | | 60/605.1 |
| 7,866,156 B2 * | 1/2011 | Nemeth et al. | | 60/605.1 |
| 7,946,269 B2 * | 5/2011 | Gerum et al. | | 123/321 |
| 7,984,705 B2 * | 7/2011 | Yang | | 123/321 |
| 8,069,665 B2 * | 12/2011 | Pursifull et al. | | 60/611 |
| 2010/0086414 A1 * | 4/2010 | Tai | | 417/34 |
| 2010/0139266 A1 * | 6/2010 | Gerum | | 60/600 |

* cited by examiner

Primary Examiner — Thai Ba Trieu
(74) Attorney, Agent, or Firm — Mark C. Bach; Jeffrey P. Calfa

(57) ABSTRACT

A control system for engine braking for a vehicle powered by a turbocharged engine uses a supercharger to assist a turbocharger compressor to boost turbocharger air flow into the engine cylinders. An engine driven air pumping device draws ambient air, or alternately exhaust gas through the pump inlet, compresses the air, and delivers the compressed air through the pump outlet to the turbocharger compressor inlet or alternately the turbocharger compressor outlet. The increased air flow into the cylinders and out of the cylinder exhaust valves increases retarding power of the vehicle.

17 Claims, 3 Drawing Sheets

SUPERCHARGED BOOST-ASSIST ENGINE BRAKE

TECHNICAL FIELD

This disclosure relates to vehicles, particularly large tractor trailer trucks, including but not limited to apparatus, control and operation for engine braking.

BACKGROUND

Adequate and reliable braking for vehicles, particularly for large tractor-trailer trucks, is desirable. While drum or disc wheel brakes are capable of absorbing a large amount of energy over a short period of time, the absorbed energy is transformed into heat in the braking mechanism.

Braking systems are known which include exhaust brakes which inhibit the flow of exhaust gases through the exhaust system, and compression release systems wherein the energy required to compress the intake air during the compression stroke of the engine is dissipated by exhausting the compressed air through the exhaust system.

In order to achieve a high engine-braking action, a brake valve in the exhaust line may be closed during braking, and excess pressure is built up in the exhaust line upstream of the brake valve. For turbocharged engines, the built-up exhaust gas flows at high velocity into the turbine of the turbocharger and acts on the turbine rotor, whereupon the driven compressor increases pressure in the air intake duct. The cylinders are subjected to an increased charging pressure. In the exhaust system, an excess pressure develops between the cylinder outlet and the brake valve and counteracts the discharge of the air compressed in the cylinder into the exhaust tract via the exhaust valves. During braking, the piston performs compression work against the high excess pressure in the exhaust tract, with the result that a strong braking action is achieved.

Another engine braking method, as disclosed in U.S. Pat. No. 4,395,884, includes employing a turbocharged engine equipped with a double entry turbine and a compression release engine retarder in combination with a diverter valve. During engine braking, the diverter valve directs the flow of gas through one scroll of the divided volute of the turbine. When engine braking is employed, the turbine speed is increased, and the inlet manifold pressure is also increased, thereby increasing braking horsepower developed by the engine.

Other methods employ a variable geometry turbocharger (VGT). When engine braking is commanded, the variable geometry turbocharger is "clamped down" which means the turbine vanes are closed and used to generate both high exhaust manifold pressure and high turbine speeds and high turbocharger compressor speeds. Increasing the turbocharger compressor speed in turn increases the engine airflow and available engine brake power. The method disclosed in U.S. Pat. No. 6,594,996 includes controlling the geometry of the turbocharger turbine for engine braking as a function of engine speed and pressure (exhaust or intake, preferably exhaust).

In compression-release engine brakes, there is an exhaust valve event for engine braking operation. For example, in the "Jake" brake, such as disclosed in U.S. Pat. Nos. 4,423,712; 4,485,780; 4,706,625 and 4,572,114, during braking, a braking exhaust valve is closed during the compression stroke to accumulate the air mass in engine cylinders and is then opened at a selected valve timing somewhere before the top-dead-center (TDC) to suddenly release the in-cylinder pressure to produce negative shaft power or retarding power.

In "Bleeder" brake systems, during engine braking, a braking exhaust valve is held constantly open during the entire engine cycle to generate a compression-release effect.

According to the "EVBec" engine braking system of Man Nutzfahrzeuge AG, there is an exhaust secondary valve lift event induced by high exhaust manifold pressure pulses during intake stroke or compression stroke. The secondary lift profile is generated in each engine cycle and it can be designed to last long enough to pass TDC and high enough near TDC to generate the compression-release braking effect.

The EVBec engine brake does not require a mechanical braking cam or variable valve actuation ("VVA") device to produce the exhaust valve braking lift events. The secondary valve lift is produced by closing an exhaust back pressure ("EBP") valve located at the turbocharger turbine outlet. When the engine brake needs to be deactivated, the EBP valve is set back to its fully open position to reduce the exhaust manifold pressure pulses during each engine cycle so that the exhaust valve floating and secondary lift as well as the braking lift event at TDC do not occur. It is assumed that there are no valve seating problems with the secondary valve lift event for this type of EVBec engine brake. Such a system is described for example in U.S. Pat. No. 4,981,119.

When operating the EVBec engine brake, when the turbine outlet EBP valve is very closed, turbine pressure ratio becomes very low, hence engine air flow rate becomes low. Also, engine delta P (i.e., exhaust manifold pressure minus intake manifold pressure) and exhaust manifold pressure may become undesirably high. As a result, the compression-release effect can be weakened, retarding power can be reduced, and in-cylinder component (e.g. fuel injector tip) temperature can become undesirably high.

The charge air for compression-release braking is delivered into the engine cylinder by turbocharged air delivery through the turbocharger compressor. For the EVBec engine brake, there may be difficulties controlling the braking valve timing of the secondary valve lift event and difficulty controlling the compressor efficiency to deliver high intake manifold boost pressure.

The present inventors have recognized the desirability of an alternate design solution that would deliver high boost air for engine braking.

SUMMARY

The exemplary apparatus and methods of the invention provide a control system for engine braking for a vehicle powered by a turbocharged engine. The apparatus and methods of the invention utilize a "supercharger" to boost turbocharger air flow. In an engine having a plurality of cylinders and an intake valve and an exhaust valve associated with each of the cylinders, wherein the intake valve opens the cylinder to an intake manifold and the exhaust valve opens the cylinder to an exhaust manifold, the control system includes an engine braking control and a "supercharger" in the form of an engine driven air pumping device operable during engine braking by command of the engine braking control to increase the flow of compressed air into the intake manifold.

For such an engine, a turbocharger has a turbine with a turbine inlet and a turbine outlet. The turbine inlet is connected to the exhaust manifold and the turbine outlet is connected to an exhaust outlet path. The turbine is driven by exhaust gas passing from the turbine inlet to the turbine outlet. A compressor is mechanically driven by the turbine. During engine operation the compressor draws ambient air through a compressor inlet and delivers pressurized air through a compressor outlet into the intake manifold.

According to one exemplary embodiment, the engine driven air pumping device has a pump inlet and a pump outlet, the pumping device draws ambient air through the pump inlet, compresses the air, and delivers the compressed air through the pump outlet. The pump outlet is flow connected to the compressor inlet.

According to another exemplary embodiment, the engine driven air pumping device draws air in the form of exhaust gas from the exhaust manifold through the pump inlet, compresses the exhaust gas, and delivers the compressed exhaust gas through the pump outlet. The pump outlet is flow connected to the compressor inlet.

According to a further exemplary embodiment, the engine driven air pumping device draws ambient air through the pump inlet, and delivers the compressed air through the pump outlet. The pump outlet is flow connected to the compressor outlet.

According to another exemplary embodiment, the engine driven air pumping device draws exhaust gas air in the form of exhaust gas from the exhaust manifold through the pump inlet, compresses the exhaust gas and delivers the compressed exhaust gas through the pump outlet. The pump outlet is flow connected to the compressor outlet.

Advantageously, for the above embodiments, the engine braking control causes the exhaust valve to open during engine braking to discharge compressed air through from the cylinder through the exhaust valve. In EVBec engine brake systems, the braking control commands an exhaust back pressure (EBP) valve in the exhaust outlet path toward a closed position during engine braking to cause exhaust manifold back pressure to cause the exhaust valve to open or lift.

The engine driven air pumping device can be an air compressor, a centrifugal compressor, or a positive displacement pump or blower, or the like.

The drive for the engine driven air pumping device can be a belt or chain drive off the engine crankshaft pulley; or electrical motor drive powered by the engine generator and/or batteries; or a hydraulic drive powered by an engine driven hydraulic pump, or the like.

An exemplary method of the invention is provided for controlling engine braking in a vehicle. The method is directed to an engine having a plurality of pistons reciprocating within a plurality of cylinders, reciprocation of the pistons causing rotation of a crankshaft. The engine includes an intake valve and an exhaust valve associated with at least one of the cylinders. The intake valve opens the cylinder to an intake manifold and the exhaust valve opens the cylinder to an exhaust manifold. The engine has a turbocharger having a turbine with a turbine inlet and a turbine outlet, the turbine inlet connected to the exhaust manifold and the turbine outlet connected to an exhaust outlet path. The turbine is driven by exhaust gas passing from the turbine inlet to the turbine outlet. A compressor is mechanically driven by the turbine. During engine operation the compressor draws ambient air through a compressor inlet and delivers pressurized air through a compressor outlet into the intake manifold. The method comprises the step of using power taken off the rotation of the crankshaft, pumping air during engine braking to increase the flow of compressed air through the exhaust valve.

According to one alternative method, the step of pumping air is further defined in that the ambient air is pumped from ambient pressure to a higher pressure and delivered into the compressor inlet.

According to another alternative method, the step of pumping air is further defined in that the exhaust gas is pumped from the exhaust manifold at exhaust manifold pressure to a higher pressure and delivered into the compressor inlet.

According to a still further alternative method, the step of pumping air is further defined in that the exhaust gas is pumped from the exhaust manifold at exhaust manifold pressure to a higher pressure and delivered into the compressor outlet.

According to a another alternative method, the step of pumping air is further defined in that the ambient air is pumped from ambient pressure to a higher pressure and delivered into the compressor outlet.

In any compression-release engine brake, as long as an efficient or appropriate braking valve event (lift) occurs at the braking TDC, in general, engine retarding power will increase with increasing peak cylinder pressure. The described embodiments and methods are particularly useful for heavy duty EVBec engine brakes or bleeder brakes. The described embodiments and methods enhance engine retarding power—through delivery of high boost pressure air to the intake manifold and hence high peak cylinder pressure.

By using supercharged boost assist, engine retarding power increases significantly through a combination of enhanced compression-release effect and increased parasitic power to drive the supercharger. Engine air flow rate increases. Injector tip temperature decreases. Engine transient torque and emissions such as soot and smoke performance improves.

The inlet pipe of the air pumping device can be located to induct one of the following during engine braking: ambient air, cold or hot boost charged air, high pressure hot air in the form of exhaust gas from exhaust manifold. The outlet pipe of the air pumping device can be located at one of the following: turbocharger compressor inlet, turbocharger compressor outlet.

If the air pumping device feeds boost air at the turbocharger compressor inlet, a check valve or two-way control valve can be used before the mixing point to prevent reverse flow to the ambient. If the air pumping device feeds boost air at turbocharger compressor outlet, a check valve or two-way control valve can be used before the mixing point to prevent reverse flow to the turbocharger compressor. Another check valve may be used as needed at the outlet of the air pumping device in order to prevent reverse flow to the air pumping device during engine firing operation or during braking operation when reverse pulse is high. When an electronically controlled two-way valve is used, its leakage of the reverse flow may be less than the leakage of the passive check valve.

The apparatus to implement an exemplary embodiment of the invention include the following: an air pumping device, a drive, inlet and outlet pipes of the air pumping device, one or two passive check valves or electronically controlled two-way valve such as an intake throttle, and an electronic control to activate and deactivate the air pumping device before and after engine braking.

The air pumping device can be an existing air compressor on the engine, such as an existing compressor for air brake tank charging.

If the air pumping device feeds boost air at turbocharger compressor outlet, the turbocharged compressor may experience a "surge" (i.e., low flow rate but high pressure ratio), depending on how high the assist boost pressure developed by the air pumping device. This compressor surge limits the potential of assist boost pressure, the power of the air pumping device and the engine retarding power. For this reason, it may be preferable to direct the assist boost air at the inlet of the turbocharger compressor.

An intake throttle valve may be used as a part of the brake control. Because the brake control using the supercharged boost assist does not rely on a precise timing of controlling the exhaust braking valve's secondary lift, it can be used for either with an undivided turbine entry or a divided turbine entry. A divided turbine entry may provide better valve timing for the secondary braking valve lift profile so that more retarding power can be produced; or, for a same power target, a smaller supercharger may be used. The supercharged boost-assist does not require high-precision electronic control in crank angle resolution.

Under some circumstances, during firing operation, engine transient performance (torque and soot/smoke reduction) may be improved significantly if the supercharged boost assist system is activated.

Numerous other advantages and features of the present invention will be become readily apparent from the following detailed description of the invention and the embodiments thereof, from the claims and from the accompanying drawings.

DETAILED DESCRIPTION

Figure 1:
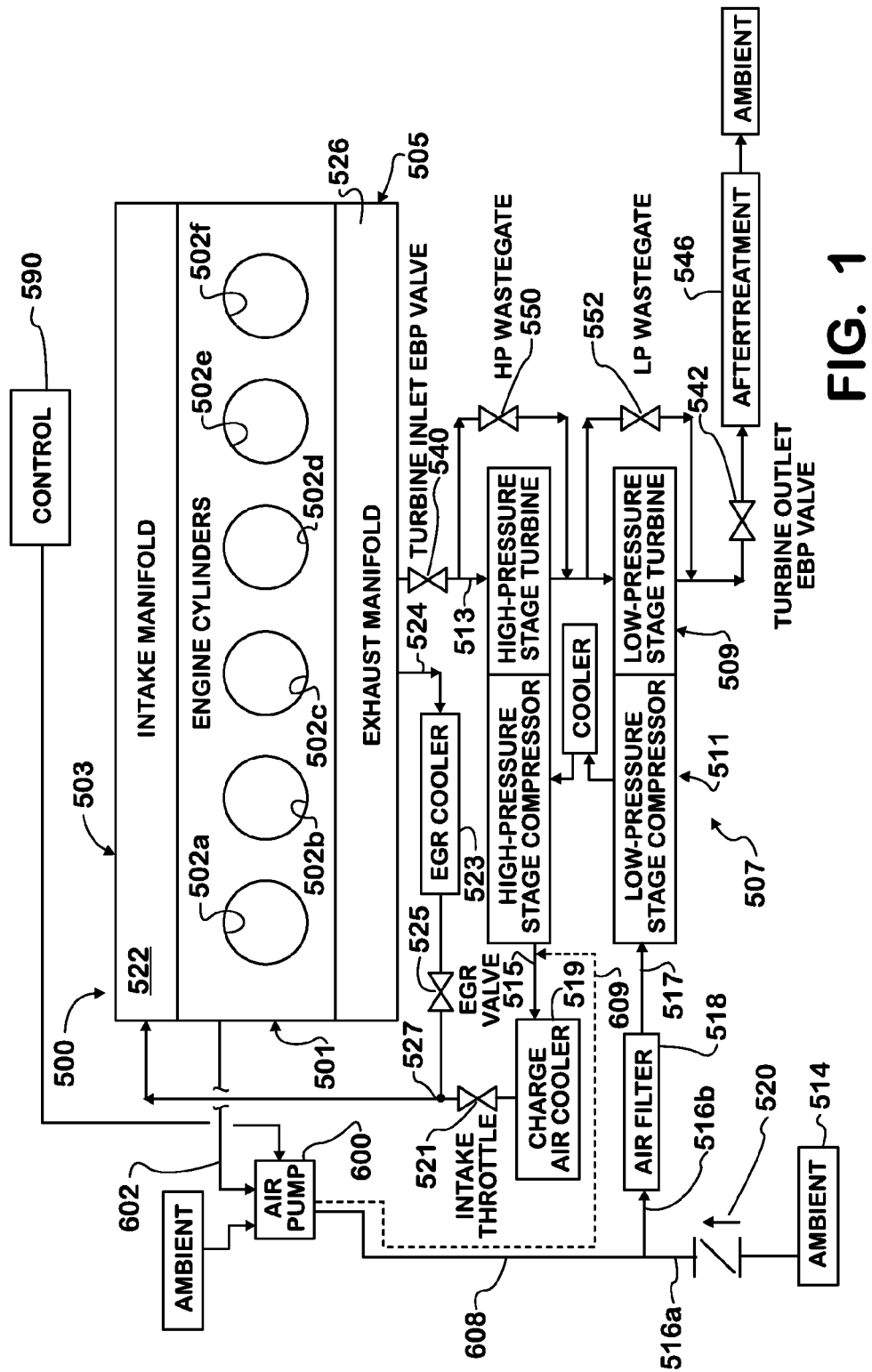
FIG. 1 is a schematic diagram of a first embodiment engine braking system according to the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

In any compression-release engine brake, as long as an efficient or appropriate braking valve event (lift) occurs at the braking TDC, in general, engine retarding power will increase with increasing peak cylinder pressure.

In compression-release engine brakes, the retarding power consists of two parts: the compression-release effect and the contribution from pumping loss. The pumping loss consists of the contributions from engine delta P, mainly related to turbine effective area, and engine volumetric efficiency, mainly affected by valve timing/event. The compression-release effect is related to the exhaust braking valve event/timing/lift near TDC and engine air flow rate or the air mass trapped near TDC. For a properly designed exhaust braking valve event/timing/lift near TDC, when engine air flow rate is higher, the compression-release effect is stronger hence the engine retarding power is higher. Therefore, retarding power is enhanced by increasing engine air flow rate within the design constraints.

For turbocharged engines, air flow rate is related to volumetric efficiency, intake manifold pressure and turbine power, which is affected by turbine effective area, exhaust manifold pressure, turbine outlet pressure and exhaust manifold gas temperature. Engine air flow rate is also related to exhaust manifold temperature through the in-cylinder cycle process. In general, the lower the air flow rate, the higher the exhaust manifold temperature. Increasing turbine outlet pressure causes a reduction in turbine power and air flow rate.

One way to increase engine air flow rate is to use a smaller turbine nozzle or various back pressure valve controls around the turbine to let the turbine spin faster, for example, closing a back pressure valve at the turbine inlet or opening a back pressure valve at the turbine outlet.

According to the exemplary embodiments and methods of the present invention, turbine power or air flow rate is increased by using an air pumping device that is driven by the engine to increase compressor boost during engine braking.

FIG. 1 illustrates an engine 500 according to an exemplary embodiment of the invention. The engine 500 has a block 501 that includes a plurality of cylinders 502a-502f. The cylinders in the block 501 are fluidly connected to an intake system 503 and to an exhaust system 505. A turbocharger 507 includes a turbine 509. The turbocharger can be a single-stage or two-stage turbocharger, either fixed geometry or variable geometry, with or without wastegate valve(s).

The turbine 509 shown has a turbine inlet 513 connected to the exhaust system 505 via an inlet EBP valve 540 (described below). The turbocharger 507 includes a compressor 511 connected to the intake system 503 through an compressed air passage 515.

During operation of the engine 500, air may enter an inlet 517 of the compressor 511 through an ambient air inlet 514, air passages 516a, 516b, and an air filter 518. Compressed air may exit the compressor 511 through the compressed air passage 515, and pass through an optional charge air cooler 519 and an optional inlet throttle 521 before entering an intake manifold 522 of the intake system 503.

Exhaust gas from the exhaust system 505 enters the exhaust manifold 526 and may be routed through an exhaust gas recirculation (EGR) conduit 524 to an exhaust gas recirculation (EGR) cooler 523 and pass through an EGR valve 525 before meeting and mixing with air from the inlet throttle 521 at a junction or mixer 527. The EGR circuit and EGR valve are also optional.

The engine 500 can include an inlet EBP valve 540 and/or an outlet EBP valve 542, a high pressure wastegate control valve 550 and/or a low pressure wastegate control valve 552. If the turbine or high-pressure-stage turbine is a variable geometry turbine ("VGT") or has adjustable turbine entry area, the EBP valve at turbine inlet may not be needed. The braking EBP valve can be a single valve or multiple valves.

Exhaust gas downstream of the EBP valve 542 is routed through aftertreatment components 546 such as a particle filter and/or a diesel oxidation catalyst housing, and a muffler and then discharged to atmosphere.

At times when the EGR valve 525 is at least partially open, exhaust gas flows through the conduit 524, through the EGR cooler 523, through the EGR valve 525 and into the junction 527 where it mixes with air from the inlet throttle 521. The amount of exhaust gas being re-circulated through the EGR valve 525 depends in part on an opening percentage of the EGR valve 525.

During engine braking, an engine braking control 590 commands activation of an air pumping device 600 that is driven by the engine via a drive 602.

The air pumping device 600 can be an air compressor, a centrifugal compressor, or a positive displacement pump or blower, or the like.

The drive 602 for the engine driven air pumping device can be a belt or chain drive off the engine crankshaft pulley; or an electrical motor drive powered by the engine generator and/or batteries; or a hydraulic drive powered by an engine driven hydraulic pump, or the like. All of these drives are powered through the rotary power of the crankshaft and result in parasitic power loss to the engine.

The air pumping device 600 draws air from ambient, compresses the air and delivers the compressed air through a path 608, through the path 516b to the air filter 518 and to the inlet 517 of the compressor 511. A check valve 520 is arranged in the passage 516a to prevent reverse flow to ambient during operation of the air pumping device 600. Alternately, the check valve could be replaced by an electronically controlled valve.

Alternately, the air pumping device 600 could deliver compressed air through path 609 (shown dashed) to the compressed air passage 515. In this case the path 608 and the check valve 520 could be eliminated.

Figure 2:
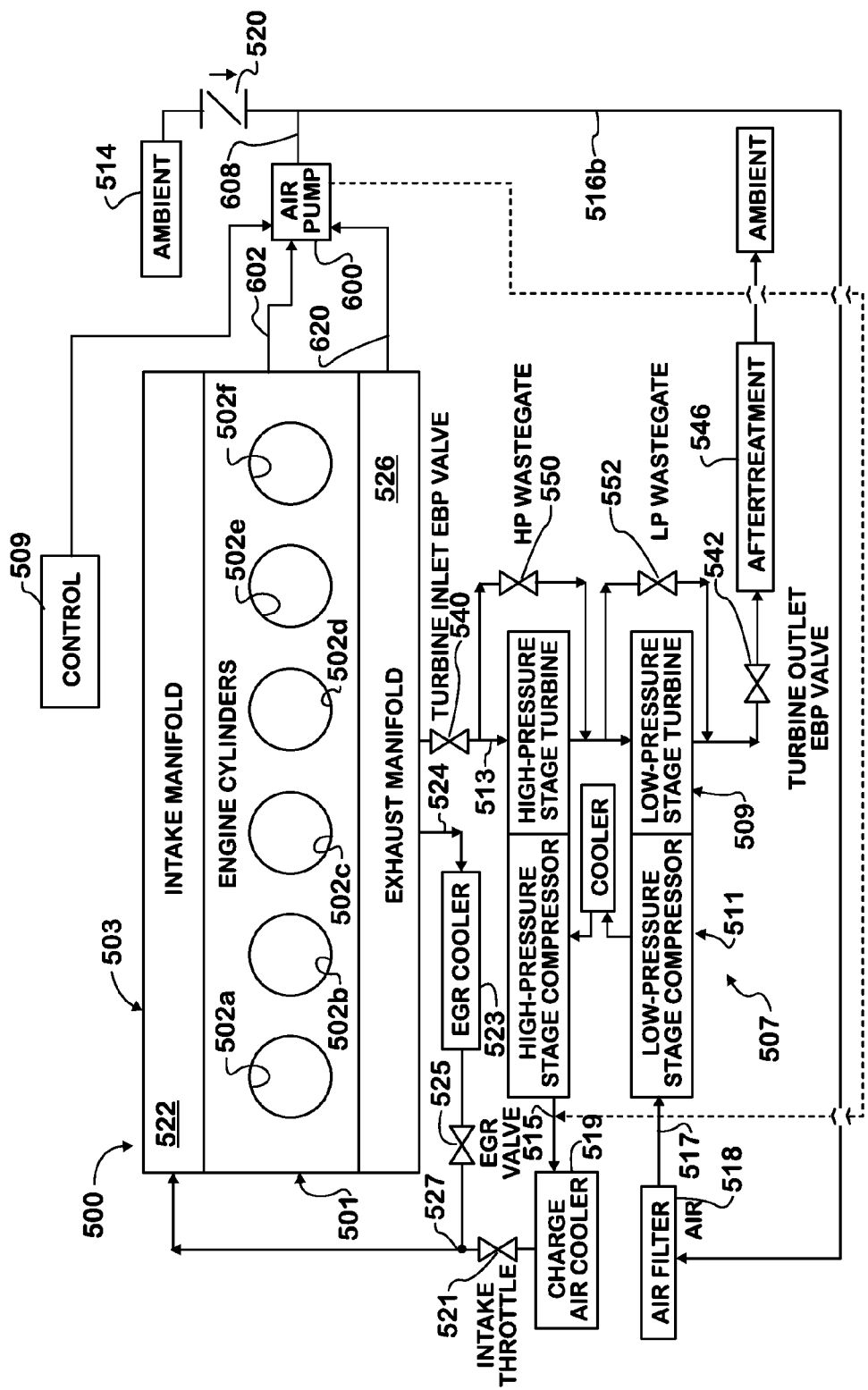
FIG. 2 is a schematic diagram of a second embodiment engine braking system according to the invention.

FIG. 2 illustrates alternate embodiments wherein the air pumping device 600 draws hot high pressure air in the form of exhaust gas through a path 620 from the exhaust manifold 526, compresses the exhaust gas and delivers the compressed exhaust gas through the paths 608, 516b to an air filter 518 and then into the inlet 517 of the compressor 511. Alternately, as before, the compressed exhaust gas could be delivered to the compressed air passage 515 via a path 609 (shown dashed).

Figure 3:
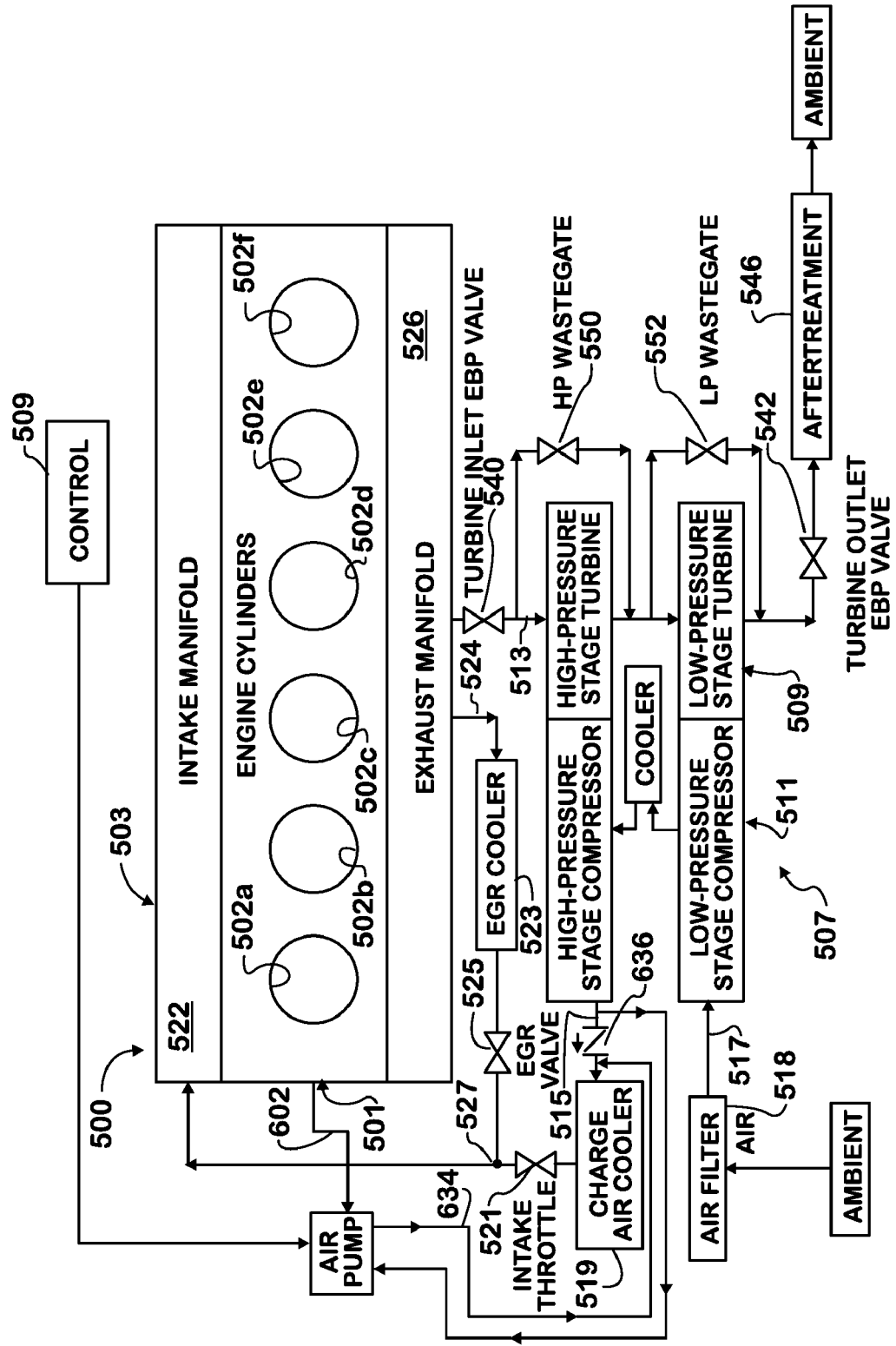
FIG. 3 is a schematic diagram of a third embodiment engine braking system according to the invention.

FIG. 3 illustrates a further alternate wherein the air pumping device 600 draws compressed air from the compressed air passage 515, through an inlet path 628 compresses the air further and delivers the compressed air through an outlet path 634 to the passage 515 upstream of the charge air cooler 519. A check valve 636, or alternately an electronically controlled valve 636, is provided in the compressed air passage 515 between the inlet path 628 and the outlet path 634, to prevent reverse flow.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A method of controlling engine braking in a vehicle powered by an engine, the engine having a plurality of pistons reciprocating within a plurality of cylinders, reciprocation of the pistons causing rotation of a crankshaft, and an intake valve and an exhaust valve associated with at least one of the cylinders, the intake valve opening the cylinder to an intake manifold and the exhaust valve opening the cylinder to an exhaust manifold, the engine having a turbocharger having a turbine with a turbine inlet and a turbine outlet, the turbine inlet connected to the exhaust manifold and the turbine outlet connected to an exhaust outlet path, the turbine driven by exhaust gas passing from the turbine inlet to the turbine outlet, and a compressor mechanically driven by the turbine, during engine operation the compressor drawing ambient air through a compressor inlet and delivering pressurized air through a compressor outlet into the intake manifold, the comprising the step of:

using power taken off the rotation of the crankshaft, pumping air during engine braking to increase the flow of compressed air into the intake manifold.

2. The method according to claim 1, wherein the step of pumping air is further defined in that the ambient air is pumped from ambient pressure to a higher pressure and delivered into the compressor inlet.

3. The method according to claim 1, wherein the step of pumping air is further defined in that the exhaust gas is pumped from the exhaust manifold at exhaust manifold pressure to a higher pressure and delivered into the compressor inlet.

4. The method according to claim 1, wherein the step of pumping air is further defined in that the exhaust gas is pumped from the exhaust manifold at exhaust manifold pressure to a higher pressure and delivered into the compressor outlet.

5. The method according to claim 1, wherein the step of pumping air is further defined in that the ambient air is pumped from ambient pressure to a higher pressure and delivered into the compressor outlet.

6. A control system for engine braking for a vehicle powered by an engine, the engine having a plurality of cylinders and an intake valve and an exhaust valve associated with at least one of the cylinders, the intake valve opening the cylinder to an intake manifold and the exhaust valve opening the cylinder to an exhaust manifold, the control system comprising:

an engine braking control;
a turbocharger having a turbine with a turbine inlet and a turbine outlet, the turbine inlet connected to the exhaust manifold and the turbine outlet connected to an exhaust outlet path, the turbine driven by exhaust gas passing from the turbine inlet to the turbine outlet, and a compressor mechanically driven by the turbine, during engine operation the compressor drawing ambient air through a compressor inlet and delivering pressurized air through a compressor outlet into the intake manifold;
an engine driven air pumping device operable during engine braking by command of the engine braking control to increase the flow of compressed air into the intake manifold.

7. The control system according to claim 6, wherein the engine braking control causes the exhaust valve to open during engine braking.

8. The control system according to claim 7, wherein the control system includes an exhaust back pressure (EBP) valve in the exhaust outlet path, the braking control commanding the EBP close position during engine braking.

9. The control system according to claim 6, wherein the engine driven air pumping device has a pump inlet and a pump outlet, the pump inlet drawing ambient air, the pump outlet flow connected to the compressor inlet.

10. The control system according to claim 9, wherein the engine braking control causes the exhaust valve to open during engine braking and, wherein the control system includes an exhaust back pressure (EBP) valve in the exhaust outlet path, the braking control commanding the EBP close position during engine braking.

11. The control system according to claim 6, wherein the engine driven air pumping device has a pump inlet and a pump outlet, the pump inlet drawing exhaust gas from the exhaust manifold, the pump outlet flow connected to the compressor inlet.

12. The control system according to claim 11, wherein the engine braking control causes the exhaust valve to open during engine braking and, wherein the control system includes an exhaust back pressure (EBP) valve in the exhaust outlet path, the braking control commanding the EBP close position during engine braking.

13. The control system according to claim 6, wherein the engine driven air pumping device has a pump inlet and a pump outlet, the pump inlet drawing ambient air, the pump outlet flow connected to the compressor outlet.

14. The control system according to claim 13, wherein the engine braking control causes the exhaust valve to open during engine braking and, wherein the control system includes an exhaust back pressure (EBP) valve in the exhaust outlet path, the braking control commanding the EBP close position during engine braking.

15. The control system according to claim 6, wherein the engine driven air pumping device has a pump inlet and a pump outlet, the pump inlet drawing exhaust gas from the exhaust manifold, the pump outlet flow connected to the compressor outlet.

16. The control system according to claim 15, wherein the engine braking control causes the exhaust valve to open during engine braking and, wherein the control system includes an exhaust back pressure (EBP) valve in the exhaust outlet path, the braking control commanding the EBP close position during engine braking.

17. The control system according to claim 6 wherein the engine driven air pumping device comprises one member of the group consisting of:

an air compressor, a centrifugal compressor, or a positive displacement pump or blower, or the like.

* * * * *